United States Patent [19]

Teague

[11] Patent Number: 5,715,589
[45] Date of Patent: Feb. 10, 1998

[54] JEWELRY FIXTURE AND METHOD

[76] Inventor: Tyler Teague, 7979 Westheimer, Suite 510, Houston, Tex. 77063

[21] Appl. No.: 581,070

[22] Filed: Dec. 29, 1995

[51] Int. Cl.$^6$ .................................. B23Q 7/00; B25B 1/00
[52] U.S. Cl. .................. 29/559; 29/896.41; 29/896.411; 29/896.412; 269/7
[58] Field of Search .......................... 29/559, 896.4, 29/896.41, 896.411, 896.412; 269/7; 81/4

[56] References Cited

U.S. PATENT DOCUMENTS

| | | |
|---|---|---|
| 3,692,023 | 9/1972 | Phillips et al. . |
| 3,834,687 | 9/1974 | Martin et al. ................ 269/7 |
| 3,897,535 | 7/1975 | Lapac et al. . |
| 3,953,013 | 4/1976 | Griffith et al. ................ 269/7 |
| 4,171,800 | 10/1979 | Weaver . |
| 4,327,608 | 5/1982 | Keys . |
| 5,210,926 | 5/1993 | Newton . |
| 5,415,623 | 5/1995 | Cherubini . |

OTHER PUBLICATIONS

Rio Grande Tools 1995 Catalog, pp. 12,13,81.
Swest Tools, Supplies & Equipment 1995 Catalog, pp. 2–5, 210 & 211.
Eisinger Enterprises Catalog #101, p. 107.

*Primary Examiner*—P. W. Echols
*Attorney, Agent, or Firm*—Browning Bushman

[57] ABSTRACT

The jewelry fixture 10, 38, 60 includes a rigid support and a low temperature polymeric material. The configuration of the rigid support may be altered for supporting a pendant, earrings, a bracelet, a necklace or a ring thereon. The low temperature polymeric material is preferably a cyclic ester polymer heated to a temperature of less than about 160° F. by contacting the polymeric material with heated water. The heated polymeric material is positioned on the support, and the jewelry is pressed partially into the heated polymeric material. The polymeric material is then allowed to harden at room temperature. The present invention substantially reduces damage while working on jewelry, and provides a reliable fixture for supporting the jewelry during manufacture, modification or repair.

20 Claims, 1 Drawing Sheet

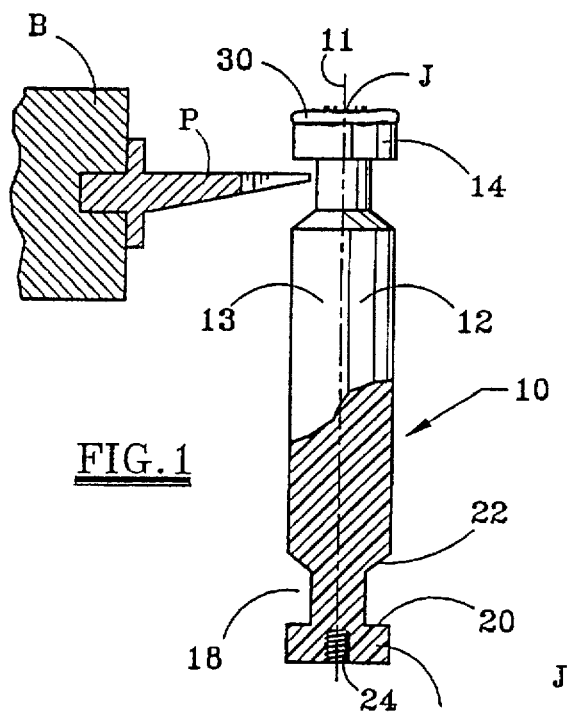
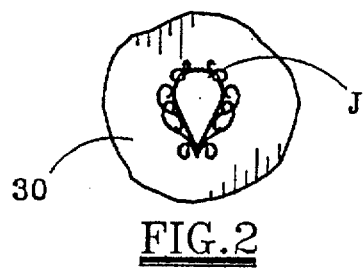
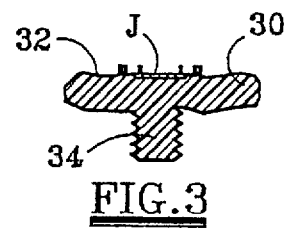
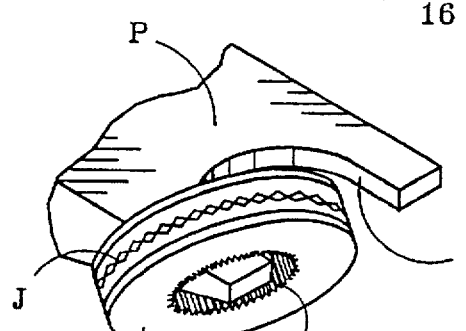
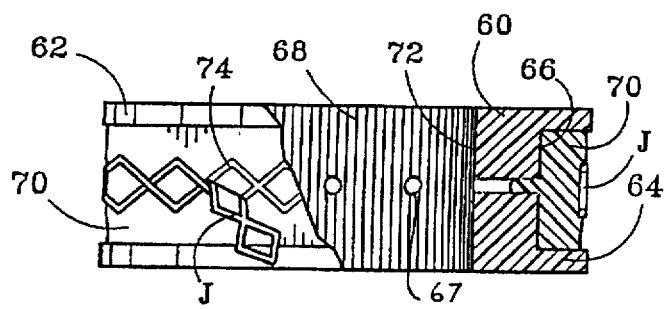
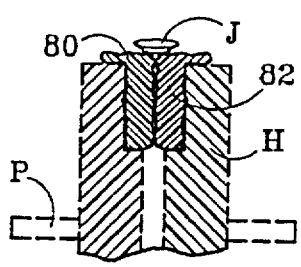
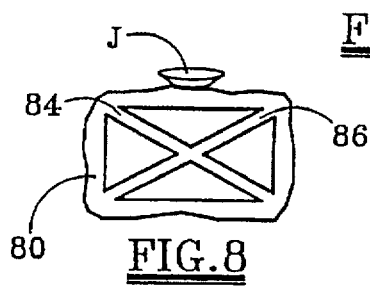
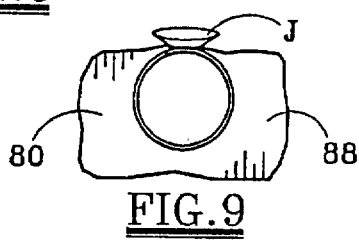

JEWELRY FIXTURE AND METHOD

FIELD OF THE INVENTION

The present invention relates to equipment and techniques to mount jewelry for manufacture, modification or repair by a jeweler. More particularly, this invention relates to a jewelry fixture and method which are compatible with a jewelry bench pin to easily and reliably mount jewelry for manufacture, modification, service, inspection, cleaning, or repair.

BACKGROUND OF THE INVENTION

Various techniques have been devised for mounting jewelry so that it may be manufactured, modified or repaired by a jeweler. Most jewelers utilize a jewelry bench with a clamp body or bench pin extending toward the jeweler from the planar top of the bench. A workholder clamp may be used to pinch the piece of jewelry to be worked upon between a pair of jaws, and the holder then placed upon the clamp body or bench pin to perform work on the piece of jewelry. An exemplary holder and clamp body is disclosed in U.S. Pat. No. 4,171,800. A revised jewelry clamp with a pair of clamp jaws is disclosed in U.S. Pat. No. 4,327,608.

Various problems have long existed with conventional techniques used to mount jewelry by mechanically pressing the jewelry between gripping jaws. Some jewelry is quite fragile, and may bend or break when clamped between conventional mechanical jaws. Unless a substantial clamping force is applied to the piece of jewelry, the jewelry may slip within the jaws when mechanical forces are subsequently applied to the piece of jewelry. If a high clamping force is applied, the jewelry may deform or break. Other jewelry, such as pendants, cannot be easily mounted on a conventional jewelry holder so that forces can be applied to the jewelry from a variety of directions.

Bracelets and necklaces are examples of jewelry that include numerous parts movable relative to other parts. Repair of a bracelet damaged at various points along its circumference is typically accomplished by the jeweler repeatedly clamping and reclamping the bracelet so that each damaged link can be properly received between the jaws of the jewelry holder. A great deal of time and expertise are required to properly mount jewelry on the holder for it to be worked upon by a jeweler. This is a particular problem when manufacturing or repairing a large number of relatively small jewelry pieces, such as pierced earrings. Considerable time and expense is associated with clamping each earring between the jaws of a holder in a manner which prevents the earring from moving when being worked upon by a jeweler.

Various techniques have been proposed for utilizing a resin in order to fixture a workpiece for performing operations on the workpiece. U.S. Pat. No. 3,897,535 discloses a process for fixturing a workpiece utilizing a liquid organic resin. The workpiece and resin are heated to a temperature of approximately 800° F., then the workpiece and resin are quenched to a temperature slightly below room temperature to solidify the workholding material. Ceramic stones are utilized to increase the holding strength of the material and reduce shrinkage. U.S. Pat. No. 5,210,926 discloses a method for fixturing a workpiece utilizing a cured resin bonded sand mixture. An exemplary workpiece is a cast iron cylinder liner for forming an aluminum engine block. The liner is placed within a core box and the resin and sand mixture is added to fill the core box. A hammer is subsequently used to remove the workholder material from the workpiece. Sand or metal shot is applied as an abrasive to remove workholder remnants from the workpiece. The technology disclosed in these patents is obviously not applicable to fixturing a piece of jewelry.

The disadvantages of the prior art are overcome by the present invention. An improved jewelry fixture and method of mounting jewelry are disclosed which may be used in conjunction with a conventional jeweler's bench and bench pin. The fixture and techniques of this invention may be easily and reliably used to mount various types of jewelry.

SUMMARY OF THE INVENTION

In an exemplary embodiment, the jewelry fixture comprises an elongate generally cylindrical support with an end plate for receiving a low temperature polymeric material. An annular recess enables the support to be easily positioned on a conventional bench pin, which in turn is secured to a jeweler's bench. A threaded cavity within the end plate receives a stud portion of a low temperature polymeric material. The post portion may be threaded into and threaded out of the cavity in the end plate for easy removal and replacement. A piece of jewelry is pressed on the low temperature polymeric material, thereby deforming the material and reliably mounting the jewelry on the support.

In another embodiment, a low temperature polymeric material is applied to the upper surface of a pad support with a plurality of holes drilled therein. An earring post may be pressed through the polymeric material and into a respective hole, so that the visible earring portion is supported on the low temperature polymeric material and the post extends into the hole in the pad support. A plurality of earrings may thus be placed on the polymeric material for being worked upon by the jeweler. In yet another embodiment, the support is a ring-shaped support with an exterior annular recess for receiving the low temperature polymeric material therein. A bracelet may be pressed into the polymeric material and thereby mounted on the support. In yet another embodiment, the low temperature polymeric material is placed between the jaws of a conventional jewelry holder, so that the hard surface of the jaws does not engage the jewelry.

The low temperature polymeric material may comprise a cyclic ester polymer, or blends of the ester polymer and polyvinyl alkyl ether. A preferred ester is polycaprolactone. The low temperature polymeric material is pliable or malleable at a temperature of from 145°–160° F., and has a molecular weight in excess of 30,000. When heated to its pliable temperature range, the jewelry may be pressed into the polymeric material to deform the material to the exact shape of the jewelry. The polymeric material does not tend to stick to metal surfaces, and the jewelry can be easily removed. The preferred polymeric material is biodegradable, is not harmful when coming into contact with human skin, and does not produce toxic or harmful fumes.

According to the method of the present invention, the desirable support for receiving the low temperature polymeric material is selected, and primarily will be the function of the configuration of the jewelry to be worked on by the jeweler. The low temperature polymeric material is heated to a temperature of less than 160° F., which preferably may be accomplished by placing the material in contact with hot water. The heated polymeric material is pliable so that it may be easily deformed both for positioning on the support and when engaged with the piece of jewelry. The polymeric material is not so hot to cause harm or irritation when contacted by the jeweler. The polymeric material may be generally molded to the desired configuration, and the piece of jewelry pressed into engagement with the polymeric material to mount the jewelry. If the mounting is unsatisfactory, or if a similar but structurally modified piece of jewelry is to be worked upon, the polymeric material may again be placed under hot water to make the material pliable, and the modified piece of jewelry then remounted on the polymeric material.

It is an object of the present invention to provide an improved fixture for working on jewelry, including a support preferably manufactured from a relatively hard plastic material and a low temperature polymeric material for engagement with the jewelry. A related object of the invention is to provide a fixture for reliably mounting jewelry without damaging the jewelry, and which does not regularly require removal of any supporting material from the jewelry after use.

A significant feature of the present invention is that the same or structurally similar piece of jewelry may be repeatedly mounted on the same fixture. The jewelry fixture is also able to reliably mount at least a substantial if not the entire elongate length of jewelry, such as a bracelet or necklace. The jewelry fixture is also designed for mounting a plurality of jewelry pieces on the same fixture.

A significant advantage of the present invention is that the time and expense of mounting a piece of jewelry is significantly reduced. The low temperature polymeric material is pliable at a temperature of less than 160° F., and hardens within a brief period of time after the jewelry is pressed into the polymeric material. The low temperature polymeric material may be repeatedly rendered pliable by heating the material with hot water from a conventional water heater. The material is biodegradable, a flame is not required to mount the material, and the material does not exude noxious gases or vapors.

These and further objects, features and advantages of the present invention will become apparent from the following detailed description, wherein reference is made to the figures in the accompanying drawings.

DESCRIPTION OF THE DRAWINGS

FIG. 1 is a side view, partially in cross-section, illustrating a suitable jewelry fixture according to the present invention for being received within a bench pin secured to a jeweler's bench.

FIG. 2 is a top view of the fixture generally shown in FIG. 1.

FIG. 3 is a cross-sectional view of the low temperature polymeric material generally shown in FIG. 1.

FIG. 4 is a pictorial view, partially in cross-section, illustrating a pierced earring ring pad support according to the present invention.

FIG. 5 is a pictorial view illustrating a ring-shaped fixture for mounting a bracelet, with the fixture positioned on a bench pin.

FIG. 6 is a side view, partially in cross-section, illustrating further details of the ring-shaped fixture generally shown in FIG. 5.

FIG. 7 is a cross-sectional view illustrating the low temperature polymeric material being used to mount jewelry on a conventional jewelry holder.

FIG. 8 is a left side view of the low temperature polymeric material and jewelry generally shown in FIG. 7.

FIG. 9 is a right side view illustrating the low temperature polymeric material and jewelry generally shown in FIG. 7 when the holder jaws are separated.

DETAILED DESCRIPTION OF PREFERRED EMBODIMENTS

FIG. 1 illustrates a jewelry fixture 10 according to the present invention for mounting a pendant or other piece of jewelry J to be worked upon by a jeweler. The jewelry fixture comprises a generally cylindrical elongate support 12 and an elastomeric material 30 which is in contact with the jewelry J. The fixture 10 is adapted, as explained subsequently, for being placed on a conventional bench pin P which has a cutout C therein (see FIG. 5). The bench pin P is secured on a conventional jeweler's bench, and conventionally extends outward toward the jeweler from the end surface of a planar top of the bench B.

The cylindrical support 12 has a central axis 11 and an upper end plate 14 and an identical lower end plate 16 each formed by a respective annular recess 18. Each of the end plates 14, 16 is thus separated from the cylindrical main body 13 of the support 12 by an annular recess. The end surface 20 of the annular recess is preferably perpendicular to the central axis 11, so that the planar surface 20 can be supported on the upper planar horizontal surface of the bench pin P, with the support 12 then being in a vertical position. The lower angled surface 22 of the annular recess 18 is spaced sufficiently from surface 20 so that the support 12 can be positioned on various types of bench pins. By providing an annular groove 18 in both the upper and lower ends of the support 12, the support can be easily inverted for positioning either of the end plates 14, 16 on top of bench pin P.

FIG. 2 is a top view of the jewelry fixture generally shown in FIG. 1, and illustrates more clearly the design of a pendant or other piece of jewelry J pressed into the upper surface of the low temperature polymeric material 30. As shown in FIG. 1, each end plate 14, 16 in the support 12 may include a threaded aperture 24. When heated, the deformable low temperature polymeric material may be pressed into the aperture and positioned generally on the upper surface of the end plate 14, 16. With the low temperature polymeric material remaining pliable, the pendant or other piece of jewelry J may be pressed into the upper surface 32 of the polymeric material 30. The jewelry J does not engage the support 12. Once the polymeric material hardens, the pendant or jewelry may be removed from the polymeric material 30, but may thereafter again be positioned on the polymeric material and reliably held in place due to a limited amount of room temperature deformation of the polymeric material. The stud portion 34 of the polymeric material fills the threaded recess 24. At room temperature, the polymeric material 30 will retain its configuration as shown in FIGS. 2 and 3 and thus may be unthreaded from the support 12, and a new hardened polymeric material with an indentation on its top surface 32 for receiving a new piece of jewelry may be threaded into the aperture 24 in one of the end plates 14, 16 of the support. From the above, it should be understood that the jewelry J becomes embedded in the polymeric material, and is supported on the polymeric material so that mechanical forces may be applied from various directions to work on the piece of jewelry J. After working on the jewelry, the jewelry may be easily removed from the polymeric material, then subsequently remounted on the hardened polymeric material.

FIG. 4 depicts another embodiment of the present invention primarily intended for supporting a plurality of pierced earrings, pendants, and similar pieces of jewelry J thereon. The support 38 includes a planar pad 40 and a lower stud 44 for threaded engagement within a respective aperture 24 in the end plate 14, 16. A plurality of holes 42 are drilled through the pad 40 for receiving a post portion of a respective pierced earring. Holes 42 in the pad are partially filled with the polymeric material as the polymeric material is pressed into engagement with the pad 40. A post of an earring will then partially displace this polymeric material and force the material further into a hole as the post is subsequently pressed into a respective hole. One or more pendants may be pressed into the polymeric material to support each pendant thereon in a manner similar to the embodiment shown in FIGS. 1–3.

An outer annular lip 46 may be provided about the circumference of the pad 40 for receiving the polymeric material 50 on the surface of the pad. The polymeric material may slightly overlap the annular lip 46, as shown in FIG. 4, or the top surface of the polymeric material may be substantially flush with the top surface of the annular lip 46. One or more gaps 48 in the annular lip 46 will be filled at least partially with the polymeric material when the pliable polymeric material is placed on the surface of the pad 40. The gap 48 will effectively form a projection in the hardened polymeric material which will allow the jeweler to remove the wafer-shaped polymeric material 50 from the pad 40, and then properly circumferentially position the wafer 50 for thereafter repositioning the same wafer on the same pad. While the pad 40 may be easily supported on a bench pin P by threading the stud 44 into the cavity 24 of cylindrical support 12, other mechanisms may be used to support the pad for working on the jewelry.

Those skilled in the art will appreciate that the support 38 allows a plurality of pierced earrings to be placed on the polymeric material, with the visible portion of each pierced earring to be worked upon by the jeweler being supported on the polymeric material 50, and with the post portion of each pierced earring projecting downward into a respective hole 42 in the pad 40. A plurality of pierced earrings mounted on the pad 40 may then be positioned on a support 12 by threading the stud portion 44 into the recess 24. Support 12 including pad 40 on the upper end plate 14 may then be positioned on the bench pin P as shown in FIG. 1 for working on the plurality of earrings.

FIG. 5 illustrates a ring-shaped support 60 positioned on one prong of a bench pin P. As previously explained, the bench pin P includes a generally U-shaped cutout C therein, thereby forming a pair of spaced prongs for supporting the support 12 therebetween. Either of the prongs formed by the cutout C also provides a projection for receiving the ring-shaped support 60 thereon. The support 60 is primarily intended for mounting a flexible elongate piece of jewelry, such as a bracelet or necklace. The outer diameter of the support 60 may be sized to receive the entire length of a bracelet. FIG. 5 shows a plurality of splines 68 on the interior surface of support 60. The irregular configuration caused by these splines allows the ring-shaped support 60 to be easily placed on one of the prongs of the bench pin P and prevents the holder 60 from inadvertently turning with respect to the bench pin P as the jeweler applies mechanical forces to the piece of jewelry. The jeweler can, of course, easily remove the support 60 partially off one of the prongs of the bench pin P, rotate the support 60 to a new desired position, then press the support 60 back on the bench pin for secured engagement at this new position. Those skilled in the art will appreciate that various configurations may be provided on the inner surface of the ring-shaped support 60, and that the splines 68 depicted in FIGS. 5 and 6 are only exemplary of suitable means for preventing the ring-shaped support from inadvertently rotating with respect to the bench pin P.

FIG. 6 illustrates more clearly the splines 68 on the inner surface 72 of the support 60. An annular outer recess 66 having a generally rectangular configuration is formed in the outer surface of the support 60, and is at least substantially filled with a polymeric material, thereby sandwiching the polymeric material 70 between the upper annular flange 62 and the lower annular flange 64 of the ring-shaped support 60. The polymeric material 70 is thus placed in the annular recess 66, and at least partially fills a plurality of circumferentially spaced holes 67 in the support 60 to prevent the hardened polymeric material from rotating on the support. The jewelry J is then pressed into the material 70 to deform the material and thereby hold the entire length of the bracelet thereon. FIG. 6 illustrates that a portion of the length of the jewelry J may be pulled away from the hardened polymeric material 70, with the indentations 74 being illustrated on the surface of the polymeric material. Accordingly, only the portion of the bracelet being worked on by the jeweler may be pressed into engagement with the polymeric material 70. Also, it should be apparent that support 60 as shown in FIG. 6 allows only a portion of an elongate bracelet, necklace or other elongate piece of jewelry to be mounted on holder 60, if desired.

FIG. 7 illustrates an upper end of a conventional jewelry holder H positioned between the prongs of a conventional bench pin P. Holder H as shown in FIG. 7 may thus be similar to the holder generally depicted in U.S. Pat. No. 4,171,800. Rather than having the opposing jaws of the holder H engage the ring or other piece of jewelry J, the present invention utilizes a pad of a polymeric material 80 and a similar pad of polymeric material 82 positioned on each of the opposing jaws of the holder H, so that the circular body portion of the ring is fitted between the pads 80 and 82 with the gem projecting upwardly therefrom. This design allows the piece of jewelry J to be supported on the polymeric material, so that no portion of the jewelry J contacts the jaws of the conventional holder H. The hardened polymeric material conforms to the configuration of the jewelry to reliably secure the jewelry in place without damaging the jewelry. The hardened polymeric material thus more evenly distributes the applied forces to the jewelry than does a leather or cloth layer between the holder and the jewelry.

FIG. 8 is a left side view of the elastomeric pad 80 with the left side of the holder removed for clarity. The elastomeric material 80 may deform to the irregular interior surface of the left jaw of the holder H, and accordingly FIG. 8 depicts the crossed bars 84 and 86 which correspond to similarly shaped crossed recesses which may be conventionally provided on the inner surface of the jaws of the holder H. FIG. 9 is a right side view of the elastomeric material 80 as shown in FIG. 7, with the left side polymeric material and the left side jaw of the holder H removed for clarity. It may be seen that the piece of jewelry J is fitted within and is supported on the elastomeric material 80. The inner planar surface 88 of the pad 80 is thus pressed against a similar opposing surface on the pad 82 when the holder is positioned as shown in FIG. 9.

A suitable low temperature polymeric material according to the present invention will be malleable, pliable or deformable at a temperature less than about 160°, and preferably will be pliable at a temperature of from 145° F. to 155° F. The polymeric material will thus be soft and moldable at a temperature which is not so hot so as to harm the jeweler upon contact, so that the jeweler can easily handle, manipulate and mold the heated polymeric material to its desired shape. The heated polymeric material tends to retain its general configuration, unless pressed or deformed by pressing the heated material on a support, or by pressing a piece of jewelry on the heated polymeric material. A suitable low temperature polymeric material according to the present invention will be a thermoplastic polyester having a molecular weight in excess of 30,000, and preferably will have a molecular weight of from 45,000 to 55,000.

A preferred polymeric material is biodegradable, and remains moldable for from one-half to two minutes after being heated before it obtains its substantially set configuration, thereby providing sufficient time for placing the polymeric material on the holder and for placing the jewelry on the polymeric material. The polymeric material is substantially rigid at room temperature and is durable, yet has enough elasticity at room temperature to allow jewelry to be repeatedly pressed into the recesses provided in the polymeric material when the jewelry is pressed on the heated polymeric material. The jewelry may be removed from the polymeric material and then reinstalled on the same hardened polymeric material.

The polymeric material according to the present invention is preferably a cyclic ester, and may be a filled cyclic ester. Suitable filling materials may include magnesium or calcium carbonate, or finely divided silica, clay, asbestos, or alpha cellulose particles. The filler material preferably will be significantly less by weight than the polymeric material. The polymeric material is a thermoplastic, since it is desirable to have the material be pliable or moldable each time it is heated to a temperature of about 150° F. A preferred material is a polycaprolactone, which polymer is sometimes referred to as an oxepane polymer, although various types of polyvinyl ethyl esters may be used.

Other desired low temperature polymeric materials are polyethylene adipate, polyepsilon caprolactone, polyvinyl stearate cellulose acetate butyrate, and ethyl cellulose. A suitable polymer according to the present invention may comprise a blend of cyclic ester polymer and polyvinyl alkyl ether. A preferred cyclic ester is poly-epsilon-caprolactone, and a preferred ether is polyvinyl alkyl ether. One suitable material is sold under the trade name CAPA 650 by Acqua-Plast Corporation. Another suitable material is sold under the trade name BIXFORM by the Bixby Corporation. Further information regarding suitable low temperature polymeric materials according to the present invention is disclosed in U.S. Pat. Nos. 3,692,023 and 5,415,623.

According to the method of the present invention, polymeric material may be easily heated to become pliable or deformable by placing the material under hot water or in a bowl of hot water which is heated with a conventional water heater until the water is at a desired temperature of from 140°-160° F., and preferably about 150° F. The polymeric material then becomes pliable and may be handled by a jeweler for placing the elastomeric material substantially in the configuration as desired on a holder. While the material is still pliable, the jewelry may be pressed into a surface of the material, and the material then allowed to harden in air at room temperature. Generally from one-half minute to two minutes will be required to allow the material to harden after it is removed from the hot water. If the material hardens before the desired time, it may again be rendered pliable by placing the material under hot water.

It should be understood that the polymeric material may be easily deformed for receiving any configuration of jewelry. The present invention is well suited for production applications wherein numerous pieces of jewelry each have the same general configuration. Each piece of jewelry may be placed on and removed from a support hundreds or thousands of times. The polymeric material will thus retain its desired configuration for retaining the jewelry thereon during repeated use.

Each of the supports for the fixtures as disclosed herein are preferably manufactured from a relatively hard thermoset plastic, such as Delrin. Other materials, such as wood, aluminum, or other metals, may be used for forming the support for the low temperature polymeric material, although plastic is preferred due to its light weight, low cost and easy cleaning features. As previously discussed, the irregular configuration of the generally cylindrical surface of the ring-shaped support need not include splines. Similarly, any type of irregular configuration may be provided about the circumference or a portion of the circumference of the pad-shaped support for receiving pierced earrings. The gap in the lip as disclosed herein is thus only one example of an irregular configuration suitable for facilitating removal of the hardened elastomeric material and the subsequent reapplication of the hardened elastomeric material on the pad support.

As previously disclosed, it is a particular feature of the present invention that the low temperature polymeric material may be easily heated to become pliable, moldable or malleable by placing the material in contact with hot water. Water is a preferred fluid for heating the material to its desired temperature, although other fluids such as air or liquids other than water could be used for heating the polymeric material. Also, it may be desirable in some cases to heat the fluid to a temperature in excess of 160° F., thereby more quickly raising the temperature of the polymeric material to its desired temperature. Preferably the heated fluid will be less than 170° F., however, since care must be taken to avoid either the heated fluid or the polymeric material irritating or harming the skin of the jeweler. Once heated to its desired temperature, the polymeric material is positioned on the desired support, and the jewelry thereafter pressed into an exposed surface of the polymeric material. The polymeric material may be allowed to harden in air at room temperature or may be hardened in room temperature water to reduce the hardening time, preferably with the jewelry remaining pressed into the deformed polymeric material. Those skilled in the art will appreciate that the polymeric material could be hardened by other methods, although hardening with a fluid at room temperature is highly desirable because of its simplicity and low cost. Those skilled in the art should appreciate that the term "room temperature" as used herein is intended to mean a temperature of from about 68° F. to about 80° F., and preferably from about 70° F. to about 74° F.

The foregoing disclosure and description of the invention is illustrative and explanatory thereof. It will be appreciated by those skilled in the art that various changes in the size, shape and materials, as well as in the details of the illustrated construction, the combinations of features, and the method steps discussed herein may be made without departing from the spirit of the invention.

What claimed is:

1. A jewelry fixture for supporting jewelry thereon while mechanical forces are transmitted to the jewelry, the jewelry fixture comprising:

a rigid support for supporting the jewelry on the support; and a low temperature polymeric material on the rigid support for engagement with the jewelry, the low temperature polymeric material being pliable at a temperature less than about 160° F. and remaining hardened while at a temperature of 80° F. or lower.

2. The jewelry fixture as defined in claim 1, wherein:

the low temperature polymeric material comprises a cyclic ester polymer having a molecular weight greater than about 30,000.

3. The jewelry fixture as defined in claim 2, wherein the low temperature polymeric material comprises polycaprolactone.

4. The jewelry fixture as defined in claim 1, wherein:

the rigid support includes an elongate generally cylindrical member with an annular recess for supporting the rigid support.

5. The jewelry fixture as defined in claim 1, wherein:

the rigid support has a threaded cavity therein; and the polymeric material has a stud for threaded engagement with the threaded cavity in the rigid support.

6. The jewelry fixture as defined in claim 1, wherein:

the rigid support includes a pad having a plurality of holes therein; and the polymeric material is positioned on an upper surface of the pad.

7. The jewelry fixture as defined in claim 6, wherein:

the pad has an irregular circumferential configuration for facilitating removal and replacement of the hardened polymeric material on the pad.

8. The jewelry fixture as defined in claim 1, wherein:

the rigid support includes a ring-shaped member with an external annular recess therein; and the polymeric material is positioned within the external annular recess.

9. The jewelry fixture as defined in claim 8, wherein:

the ring-shaped member has an irregular internal configuration for temporarily fixing the position of the ring-shaped member on a supporting member.

10. The jewelry fixture as defined in claim 1, wherein the rigid support is fabricated from thermoset plastic.

11. A method for supporting jewelry while mechanical forces are transmitted to the jewelry, the method comprising:

heating a low temperature polymeric material to a temperature of less than about 160° F., pressing the jewelry into engagement with the heated polymeric material to support the jewelry on the polymeric material, and hardening the polymeric material to room temperature.

12. The method as defined in claim 11, wherein:

heating the polymeric material comprises engaging the polymeric material with a heated fluid.

13. The method as defined in claim 11, wherein the low temperature polymeric material is a cyclic ester polymer having a molecular weight greater than about 30,000.

14. The method as defined in claim 13, wherein the polymeric material comprises caprolactone.

15. The method as defined in claim 11, further comprising:

after hardening the polymeric material to room temperature, thereafter reheating the polymeric material to a temperature of less than about 160° F., and thereafter repressing the jewelry into engagement with the reheated polymeric material.

16. A method of supporting jewelry while mechanical forces are transmitted to the jewelry to manufacture, modify, service, clean or repair the jewelry, the method comprising:

heating a low temperature polymeric material to a temperature of less than about 160° F.;

positioning the heated low temperature polymeric material on a rigid support;

pressing the jewelry on the heated polymeric material; and cooling the polymeric material to room temperature.

17. The method as defined in claim 16, wherein:

the polymeric material is heated to a temperature of from about 145° F. to about 160° F.

18. The method as defined in claim 16, wherein:

the polymeric material is heated by contacting the polymeric material with a fluid heated to a temperature of less than about 170° F.

19. The method as defined in claim 16, wherein the heated polymeric material is cooled by maintaining the polymeric material in a fluid at room temperature.

20. The method as defined in claim 16, further comprising:

after cooling the polymeric material, thereafter reheating the polymeric material to a temperature of less than about 160° F.; and thereafter depressing the jewelry on the reheated polymeric material.

* * * * *